(12) United States Patent
Kaderabek et al.

(10) Patent No.: US 10,728,996 B2
(45) Date of Patent: Jul. 28, 2020

(54) CIRCULAR X-RAY TUBE AND AN X-RAY INSTRUMENT COMPRISING THE CIRCULAR X-RAY TUBE

(71) Applicant: Radalytica s.r.o., Holice, Olomouc (CZ)

(72) Inventors: Richard Kaderabek, Lisany (CZ); Josef Uher, Roznov pod Radhostem (CZ)

(73) Assignee: Radalytica s.r.o., Holice (CZ)

( * ) Notice: Subject to any disclaimer, the term of this patent is extended or adjusted under 35 U.S.C. 154(b) by 0 days.

(21) Appl. No.: 16/052,681

(22) Filed: Aug. 2, 2018

(65) Prior Publication Data

US 2019/0045613 A1 Feb. 7, 2019

(30) Foreign Application Priority Data

Aug. 7, 2017 (CZ) .................................... 2017-454

(51) Int. Cl.
*H05G 2/00* (2006.01)
*G01N 23/044* (2018.01)
*H01J 35/02* (2006.01)
*H01J 35/06* (2006.01)

(52) U.S. Cl.
CPC ............ *H05G 2/00* (2013.01); *G01N 23/044* (2018.02); *H01J 35/02* (2013.01); *H01J 35/06* (2013.01); *G01N 2223/308* (2013.01); *G01N 2223/309* (2013.01); *H01J 2235/06* (2013.01)

(58) Field of Classification Search
None
See application file for complete search history.

(56) References Cited

U.S. PATENT DOCUMENTS

| 4,158,142 | A | 6/1979 | Haimson | |
|---|---|---|---|---|
| 8,699,666 | B2 * | 4/2014 | Putterman | H05G 2/00 378/119 |
| 9,008,277 | B2 * | 4/2015 | Camara | H05G 2/00 378/140 |
| 9,208,985 | B2 * | 12/2015 | Camara | H01J 35/02 |
| 9,386,674 | B2 * | 7/2016 | Putterman | H05G 2/00 |
| 9,728,368 | B2 * | 8/2017 | Camara | H05G 2/00 |
| 9,991,084 | B2 * | 6/2018 | Camara | H05G 2/00 |
| 10,361,056 | B2 * | 7/2019 | Camara | H01J 35/02 |
| 10,398,013 | B2 * | 8/2019 | Camara | H05G 2/00 |

(Continued)

FOREIGN PATENT DOCUMENTS

JP  H1140392  2/1999

*Primary Examiner* — Thomas R Artman
(74) *Attorney, Agent, or Firm* — Mark M. Friedman

(57) ABSTRACT

The circular X-ray tube for the irradiation of the object (1) by X-radiation comprising the circular body (2) and at least two friction elements that rub together whereby forming a triboluminescent source of X-radiation. The one friction element comprises at least one circumferential element (3) arranged on the external circumferential side of the circular body (2) of the X-ray tube and the other friction element comprises at least one pressure element (4) that is pressed against the circumferential element (3), where the pressure element (4) is adapted for dragging upon the circumferential element (3), and/or at least one circumferential element (3) is adapted for pulling through under the pressure element (4). The X-ray instrument utilizes the circular X-ray tube and the imaging detectors (7) of ionizing radiation.

5 Claims, 13 Drawing Sheets

(56) References Cited

U.S. PATENT DOCUMENTS

| | | | |
|---|---|---|---|
| 2011/0130613 A1* | 6/2011 | Putterman | H05G 2/00 600/1 |
| 2013/0336460 A1 | 12/2013 | Camara et al. | |
| 2014/0226790 A1* | 8/2014 | Putterman | H05G 2/00 378/119 |
| 2014/0270085 A1* | 9/2014 | Camara | H05G 2/00 378/124 |
| 2014/0369474 A1* | 12/2014 | Nottke | H05G 2/00 378/119 |
| 2015/0213993 A1* | 7/2015 | Camara | H05G 2/00 378/140 |
| 2016/0088719 A1* | 3/2016 | Camara | H01J 35/02 378/119 |
| 2016/0166223 A1 | 6/2016 | Besson | |
| 2017/0257936 A1* | 9/2017 | Camara | H05G 2/00 |
| 2018/0068822 A1* | 3/2018 | Camara | H05G 2/00 |
| 2019/0045613 A1* | 2/2019 | Kaderabek | G01N 23/044 |

\* cited by examiner

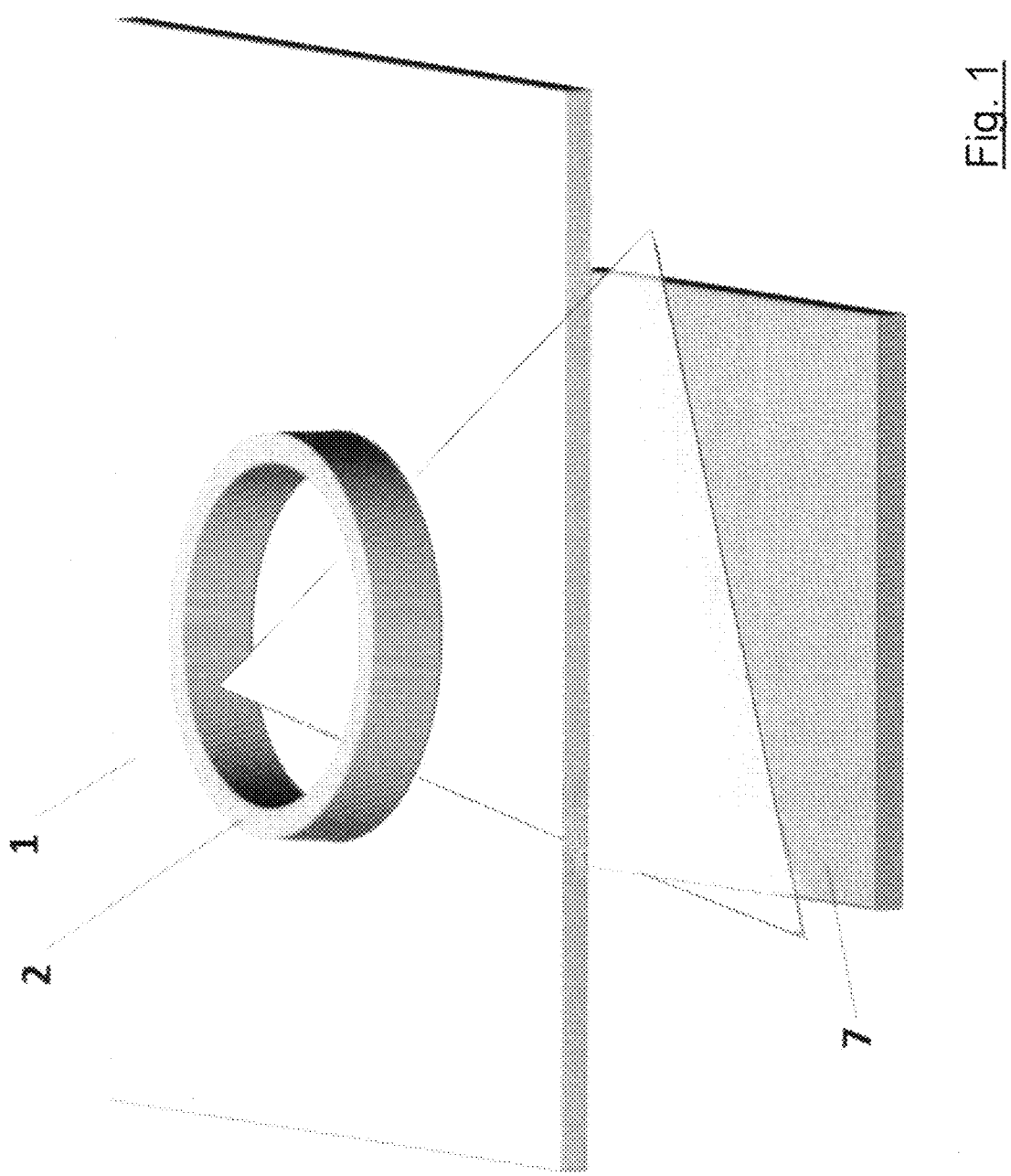

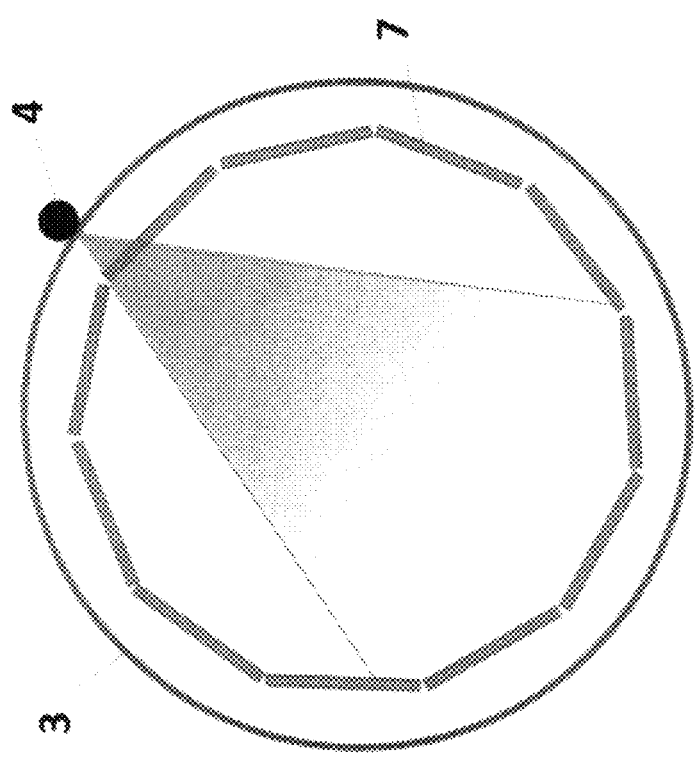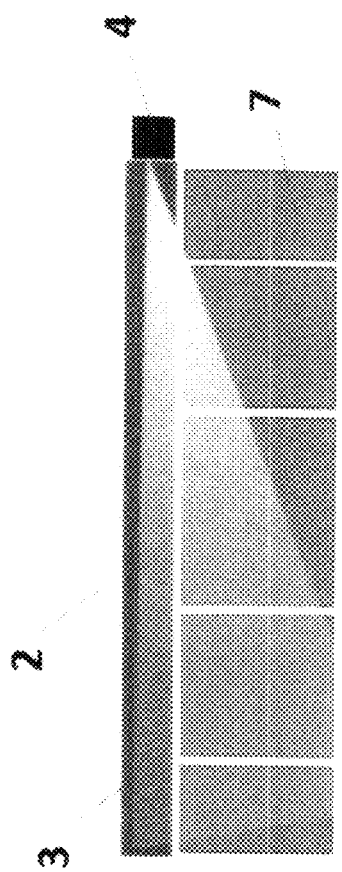

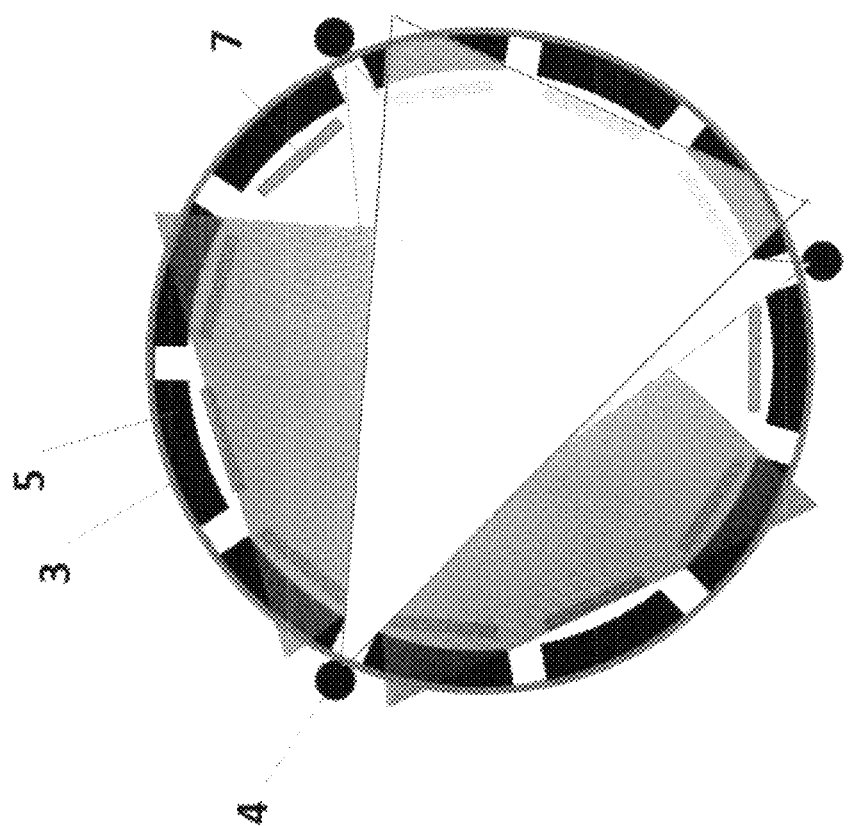

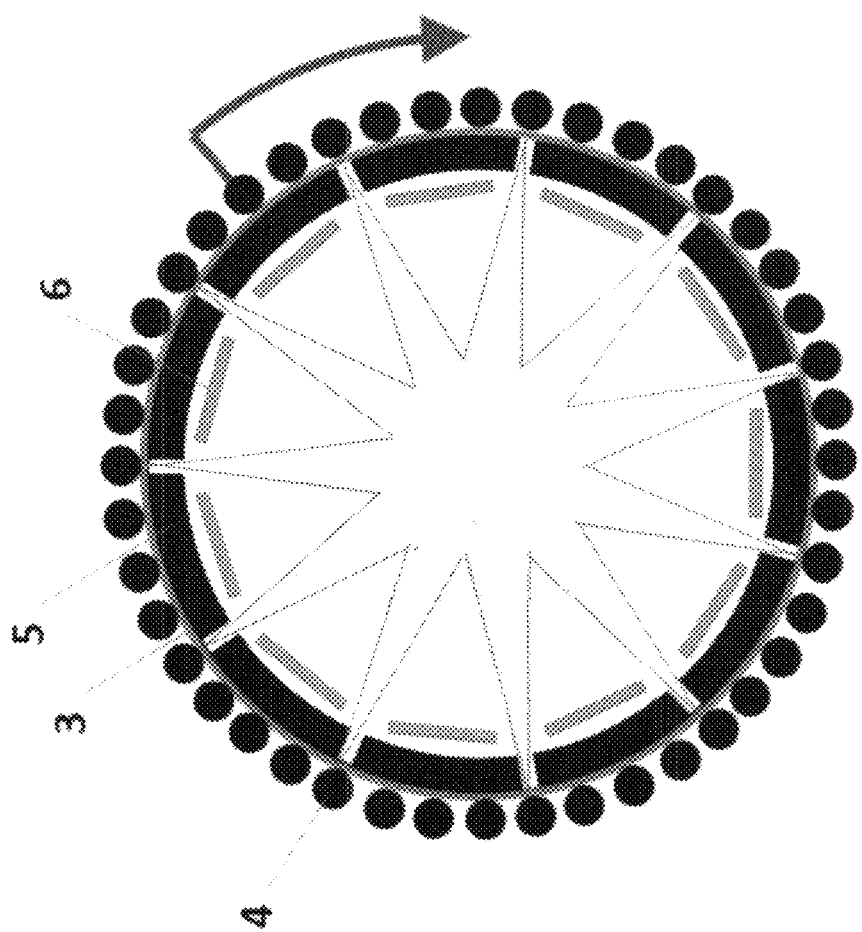

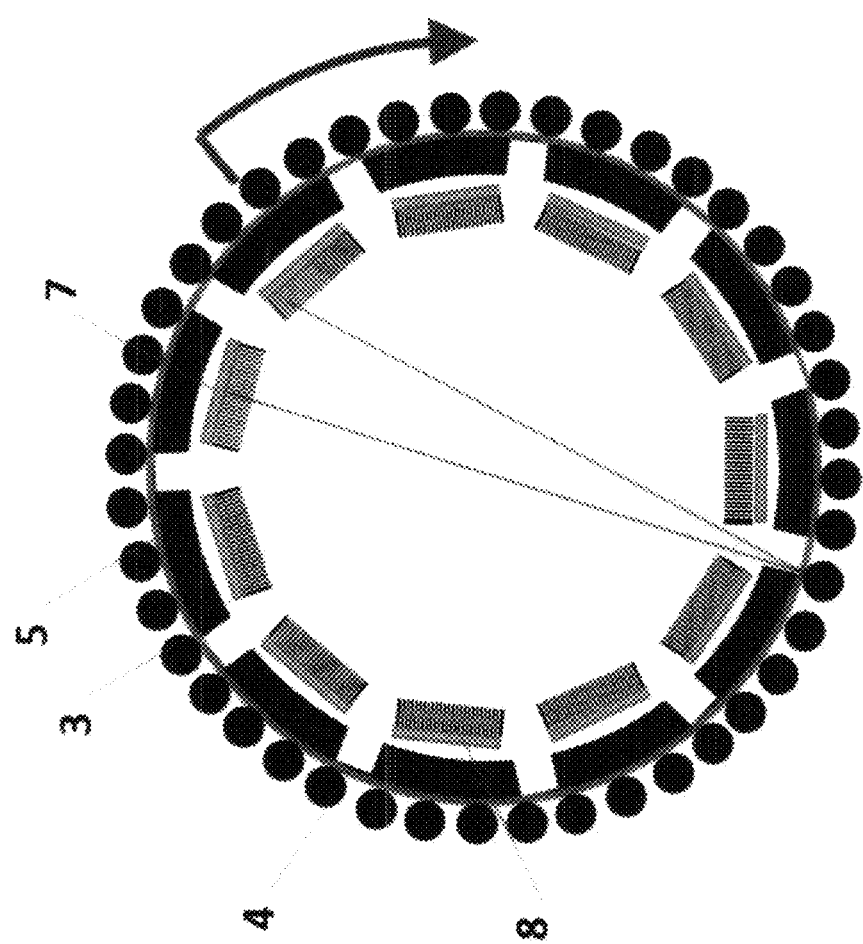

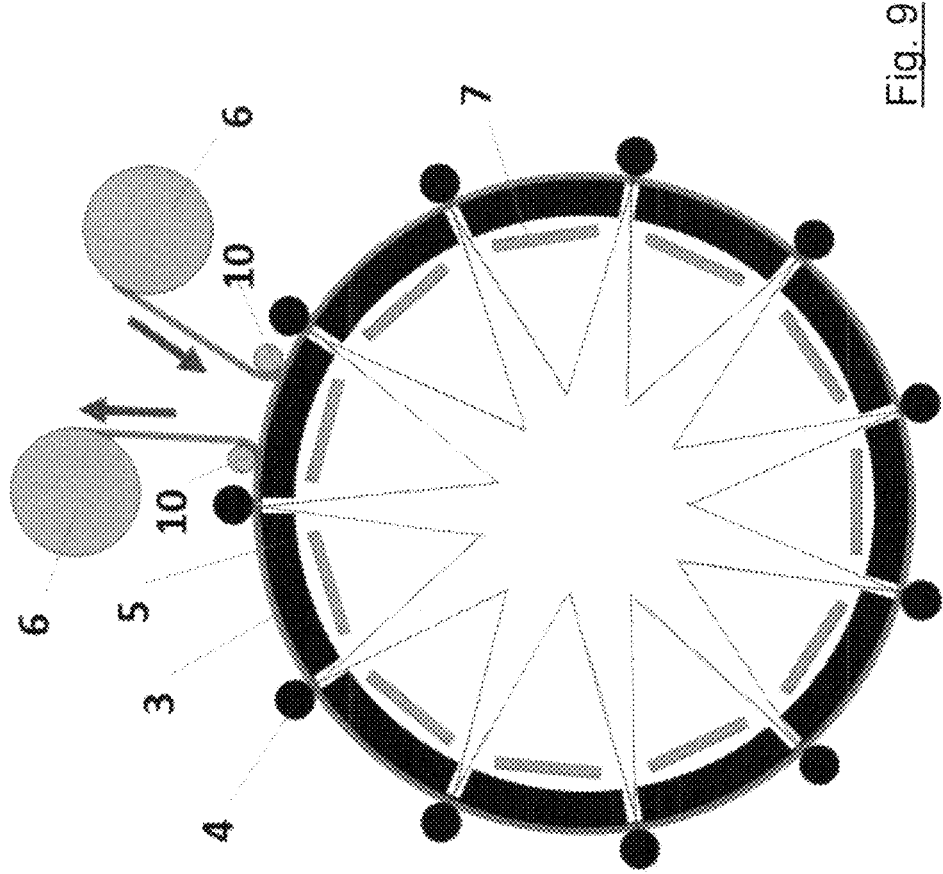

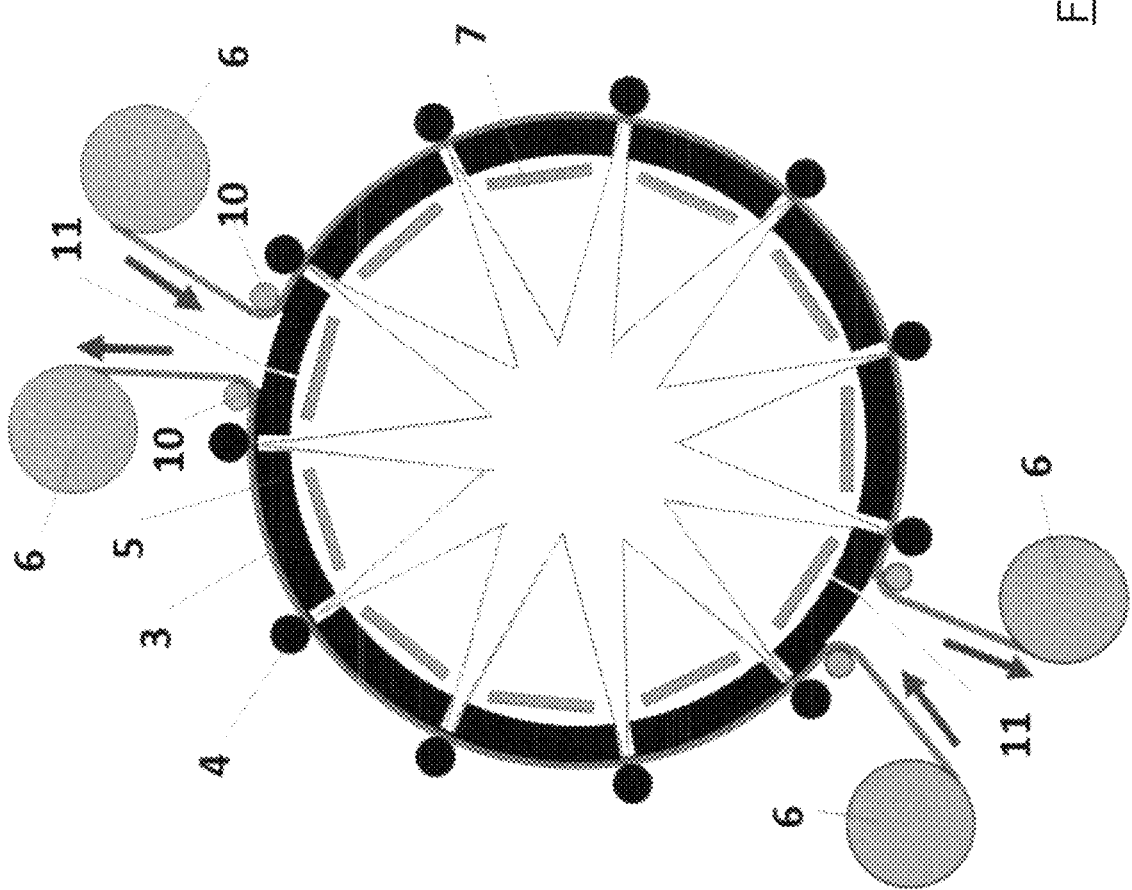

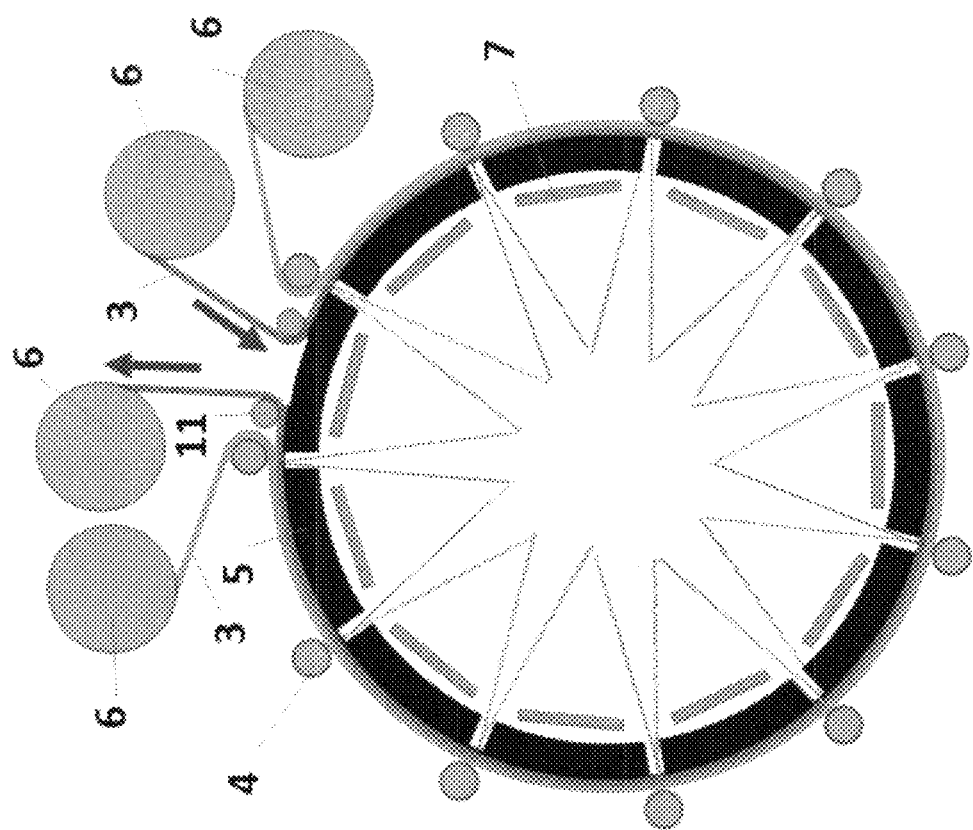

CIRCULAR X-RAY TUBE AND AN X-RAY INSTRUMENT COMPRISING THE CIRCULAR X-RAY TUBE

FIELD OF THE INVENTION

The invention concerns circular X-ray tubes for the generation of X-radiation and an X-ray instrument fitted with the circular X-ray tube to acquire X-ray images.

BACKGROUND OF THE INVENTION

X-radiation is a type of electromagnetic radiation that is generated by interactions of high energy electrons. Interactions of high energy electrons can be found in a natural environment or can be initiated artificially. Instruments purposefully used for X-radiation generating are generally called X-ray tubes.

While the release of energy in the form of X-radiation during an interaction of high energy electrons follows the laws of nature, the principle, based on which high energy electrons are prepared for the interaction in individual X-ray tubes, may differ.

Known X-ray tubes comprise electricity-powered X-ray tubes. This X-ray tube in its simplest version includes two electrodes, the cathode and the anode, that are installed in an air-tight glass bulb under reduced pressure. The electrodes are connected to a source of high voltage that provides the electrons emitted from the cathode and accelerated by the electric field between the electrodes with high energy. When such high energy electrons strike upon the anode, they penetrate its material. During such penetration the energy of the electrons is absorbed by the anode material and is subsequently released in the form of braking radiation whose components comprise X-radiation. The anode is designed in the form of a metal target that is usually square- or rectangular-shaped.

The disadvantages of standard X-ray tubes rest in the fact that the X-ray tubes must be connected to a source of high electric voltage. "In-situ" deployment of such X-ray tubes is considerably limited by this fact. Among other disadvantages is rather expensive manufacture and the fact that X-ray tubes are sensitive to rough handling that cannot always be eliminated in the field operations.

Among other X-ray tubes are so-called triboluminescence X-ray tubes. These X-ray tubes generate X-radiation by electrons that acquire the necessary high energy from triboluminescence. Triboluminescence is a physical phenomenon during which an electric charge is acquired by friction or crystal lattice deformation and the accumulated electric charge is discharged in the form of the transformation of high energy electrons. An example of the triboluminescent X-ray tube is, for example, the invention of a friction source of X-rays disclosed in the US 2013/0336460 A1 patent application (Carlos Camara, Mark G. Valentine). This invention deals with one of the major disadvantages of electrically powered X-ray tubes, namely dependence on the sources of high electric voltage. The X-ray tube according to the registered invention comprises a drive turning up a friction head. The friction head rubs a friction belt, which excites the triboluminescence effect. The friction head and friction belt are located in an environment with reduced pressure.

Common disadvantage of the aforementioned known X-ray tubes include the fact that if an object is put into the line of X-radiation, only one side the object is irradiated. If is it necessary to irradiate the object along the entire perimeter, the object must be rotated around the X-ray tube installed in a static way, or the X-ray tube must move around the statically installed object. Particularly, the method known as CT scanning and the subsequent reconstruction of a three-dimensional model of the object's internal structure requires a large set of X-ray images taken from many different angles. X-ray images are acquired by an X-radiation detector that is arranged behind the object if seen from the position of the X-ray tube and is situated in the line of the X-radiation coming out of the object. The need to move the X-ray tube—detector pair is demanding and requires expensive mechanical solutions. This reduces the speed of measurement and, moreover, the movement of the object or the X-ray tube introduces inaccuracies in the set of X-ray images that need to be compensated or otherwise compromise the quality of the resulting three-dimensional model. Therefore, it is desirable to minimize the rotational movement of the X-ray tube.

Minimization of such rotational movement is resolved, for example, by deployment of a group of X-ray tubes that are arranged around the object. An example of such a solution is disclosed in the US 2016/0166223 A1 patent application (Guy M. Besson). Although the aforementioned invention successfully resolves the rotational movement of the X-ray tube or the object, its disadvantages rest in the fact that its design requires a suitable supporting frame, is complicated and is suitable in particular for deployment in a static site. The invention utilizing a train of X-ray tubes requires a source of high voltage that is also difficult to convey.

The rotational movement of the X-ray tubes or the object is covered in the patent document U.S. Pat. No. 4,158,142 B (Jacob Haimson). The invention discloses a static X-ray tube that emits X-radiation that is led and swept on all sides of the object by means of electron optics. Electron optics accurately focuses the X-ray beam at any place along the entire perimeter of the irradiated object, which makes X-ray images from this instrument very accurate and measurements very fast. Disadvantages of this invention rest in particular in the fact that the acquisition costs of the electron optics are very high, the construction of the entire instrument is demanding and the presented instrument has a limited depth for inserting objects, which means that it is not suitable for elongated objects. Among other disadvantages is the fact that the presented instrument is not portable and is appropriate for static sites.

Although the requirements imposed by the method of CT scanning and the object internal structure three-dimensional model reconstruction are fulfilled by the aforementioned inventions to a great extent, there are still some disadvantages limiting a wide deployment of these known inventions. Such disadvantages include in particular high acquisition costs, requirements imposed on space and source of energy, spatial demands and necessity of gentle handling.

The task of the invention is the manufacture of a circular X-ray tube for the generation of X-radiation and of an X-ray instrument fitted with the circular X-ray tube to acquire X-ray images. Thanks to its design, the invention would make it possible to irradiate the object from all its sides, would be compact, easily portable, easily serviceable, would not require a source of high voltage and would be appropriate for use in X-ray instruments designed for deployment outside static sites, in particular in X-ray instruments designed for use in the field. The instrument according to the invention would not require full rotational movement by 360°, which would simplify its design to a great extent. The circular X-ray tube according to the invention would be more resistant to rough handling compared to the currently known X-ray tubes and its acquisition costs would be lower.

SUMMARY OF THE INVENTION

The set goal has been resolved by the design of the circular X-ray tube according to the following invention.

The circular X-ray tube used for the irradiation of an object by X-radiation that is generated due to the triboluminescent effect, comprising a circular body with at least two friction elements that rub together and form a triboluminescent source of X-radiation.

The essence of the invention rests in the fact that the friction element one comprises at least one circumferential element arranged at the external circumferential side of the X-ray tube circular body. The friction element two comprises at least one pressure element that is pushed against the circumferential element where the pressure element is adapted for dragging upon the circumferential element, and/or at least one circumferential element is adapted for pulling through under the pressure element. To generate X-radiation, it is necessary to provide the presence of the triboluminescence effect where it is possible to drag the pressure element upon the circumferential element or pull through the circumferential element under the pressure element. The advantage of the utilization of the triboluminescent effect is independence of electric voltage, the robust design of the X-ray tube and the easy replacement of the elements allowing friction to be generated. Preferably, the circular body also provides support and allows the source of X-radiation to irradiate within the full range of 360°.

In a preferred embodiment of the circular X-ray tube according to the invention, the circular body is fitted with at least one shield of ionizing radiation where the shield is equipped with at least one opening for unshielded passage of X-radiation. Considering the fact that X-radiation spreads in space from the triboluminescent source in all directions, it is necessary to shield undesired spread and collimate the X-radiation to form the desired beam. Preferably, the desired beam of X-radiation is collimated and focused using the position of an opening in the shield that can be adjusted in a controlled manner and using a controlled change of its size.

In a preferred embodiment of the circular X-ray tube according to the invention the shield can move with regard to the circular body. If the shield is movable with regard to the circular body, it is possible, e.g. by rotating the shield, to change the X-radiation incidence side, or it is possible to acquire, by a minor shift of the shield, a different set of irradiation directions that can be used, for example, for acquiring a set of images for CT applications.

In a preferred embodiment of the circular X-ray tube according to the invention the circumferential element comprises at least one friction belt whose free ends are fixed to wind-up spools. The friction belt allows the pressure elements to have a static design and the use of the belt will extend the service life of the circumferential element depending on the total length of the belt. The belt can be easily replaced with a new one and the solution of the wind-up spools drive is easier in terms of design than the solution of the drive for pressure elements rotating along the circumferential element or for the rotational movement of the circumferential element under the pressure elements. The use of the friction belt and wind-up spools arranged outside the circular body reduces the number of moving parts in the X-ray tube design related to the circular body, which improves its resistance to mechanical damage. The use of the friction belt allows the triboluminescence effect to be generated at higher speeds, which improves the quality of X-radiation, e.g. by the elimination of X-radiation intensity fluctuations.

In a preferred embodiment of the circular X-ray tube according to the invention the circular body is openable or dismountable into at least two pieces. If it is possible to interrupt the circular body, then the circular X-ray tube can be installed on elongated objects, such as pipelines.

The invention also includes an X-ray instrument to acquire X-ray images.

The X-ray instrument for the acquisition of X-ray images of an object comprises a circular X-ray tube designed according to the aforementioned invention that is used for the irradiation of the object by X-radiation emitted during the triboluminescent effect where the object is arranged in the region for the positioning of the irradiated object. The region for the positioning of the irradiated object is located inside the space delimited by the circular body of the circular X-ray tube or under the space or above the space delimited by the circular body. In addition, the X-ray instrument comprises at least one detector of ionizing radiation.

The essence of the invention rests in the fact that at least one detector of ionizing radiation is planar with impact detection surface and is arranged inside the space delimited by the circular body of the circular X-ray tube, or under/ above the space delimited by the circular body. The detector is aligned with the region for the positioning of the irradiated object and its impact detection surface faces the region for the positioning of the object.

The X-ray instrument can be used for the acquisition of X-ray images of the object from any position within the full range of 360°. The prerequisite is that the detector is aligned behind the region for the positioning of the irradiated object and that the impact detection surface faces the region for the positioning of the irradiated object. The X-ray instrument allows an extensive set of images for the modelling of the object internal structure to be acquired. The X-ray beam spreads in all directions and therefore it is possible to arrange the detector either under or above the space delimited by the circular body. Preferably, X-radiation can be used for the X-ray laminography of a planar irradiated object.

In a preferred embodiment of the X-ray instrument according to the invention at least three detectors are arranged to form a polygonal detection field substantially copying a circular ground plan. The number of detectors forming the detection field affects the degree of the polygon. If the number of used detectors is small, there are gaps between individual detectors and the impact detection surfaces of the neighbouring detectors form a distinctive angle. The advantage of the detection field is the fact that it is not necessary to move the detectors, i.e. they can be stationary, which eliminates one working rotation compromising the quality of acquired images.

In a preferred embodiment of the X-ray instrument according to the invention at least one detector is fitted with a grid electrode to shield X-radiation. The X-radiation coming from other angles than from the required source of radiation arranged opposite the impact detection surface of the given detector distorts the detection, reduces the legibility of images and has a negative impact on the X-ray scanning of the object. The grid electrode absorbs the X-radiation striking upon the impact detection surface at an acute angle by which false signals in the pixels of the imaging detector are eliminated.

In a preferred embodiment of the X-ray instrument according to the invention at least one detector is tilting for the angular adjustment of its impact detection surface. In particular in the case of detectors arranged above or under the space delimited by the circular body of the X-ray tube, it is necessary to compensate the angle of X-radiation incidence onto the impact detection surface of the detector. The tilting of the detector is a simple and fully functional solution of the problem.

In a preferred embodiment of the X-ray instrument according to the invention the X-ray instrument is fitted with a secondary shield shielding at least one impact detection surface of the detector from the direct impact of the X-radiation from the triboluminescent source. To make the X-ray instrument acquire images of scattered and fluorescent X-radiation, the impact detection surface of the detector must be protected against an impact of direct X-radiation which would distort the required image.

In a preferred embodiment of the X-ray instrument according to the invention the X-ray instrument is fitted with at least one means for the rotational movement of the circular X-ray tube around the object, including the detectors, where the detectors and the circular X-ray tube are fixed with regard to one another, or with at least one means for the rotational movement of the object within the region for the positioning of the object. The exact modelling of the internal structure of the object requires an extensive set of images and with a constant number of irradiation angles, the angular displacement of the object or the angular displacement of the circular X-ray tube with detectors changes irradiation angles, which may further extend the required set of images by new ones.

In a preferred embodiment of the X-ray instrument according to the invention the X-ray instrument is fitted with at least one means for the rotational movement of the circular X-ray tube around the object. The circle of the detectors is statical and the circular X-ray tube rotates with regard to the sample and the detectors. The exact modelling of the internal structure of the object requires an extensive set of images and with a constant number of irradiation angles, the angular displacement of the object or the angular displacement of the circular X-ray tube changes irradiation angles, which may further extend the required set of images by new ones.

The advantages of the invention include the use of the triboluminescent effect for the irradiation of the object within the full range of 360°, the absence of high voltage, the compact nature of the invention, design resistant to mechanical damage, easy repairability, reduction in the scope of working rotations and/or elimination thereof, use for standard irradiation by X-rays, X-ray laminography, the analysis of scattered and fluorescent X-radiation also in combination with transmission computer tomography. The invention is suitable for deployment when working in the field and is ideal for the irradiation of elongated objects.

EXPLANATION OF DRAWINGS

The present invention will be explained in detail by means of the following figures where:

FIG. 1 shows a schematic diagram of the use of the invention for X-ray laminography, FIG. 2a shows a plan view of the schematic diagram of the invention with only one pressure element, FIG. 2b shows a side view of the schematic diagram of the invention with only one pressure element, FIG. 4 shows a schematic diagram of the invention with unequally distant pressure elements, FIG. 6 shows a side view of the schematic diagram of the invention with rotating pressure elements and with a static shield, FIG. 7 shows a schematic diagram of the invention with detectors fitted with a grid electrode to shield X-ray beams with an undesirable angle of incidence, FIG. 9 shows a schematic diagram of the invention with a circumferential element comprising a friction belt wound on wind-up spools and pulled-through under pressure elements, FIG. 12 shows a schematic diagram of the invention with a divided circular X-ray tube, FIG. 13 shows a schematic diagram of the invention with two pressure elements.

AN EXAMPLE OF THE INVENTION EMBODIMENT

Figure 3A:
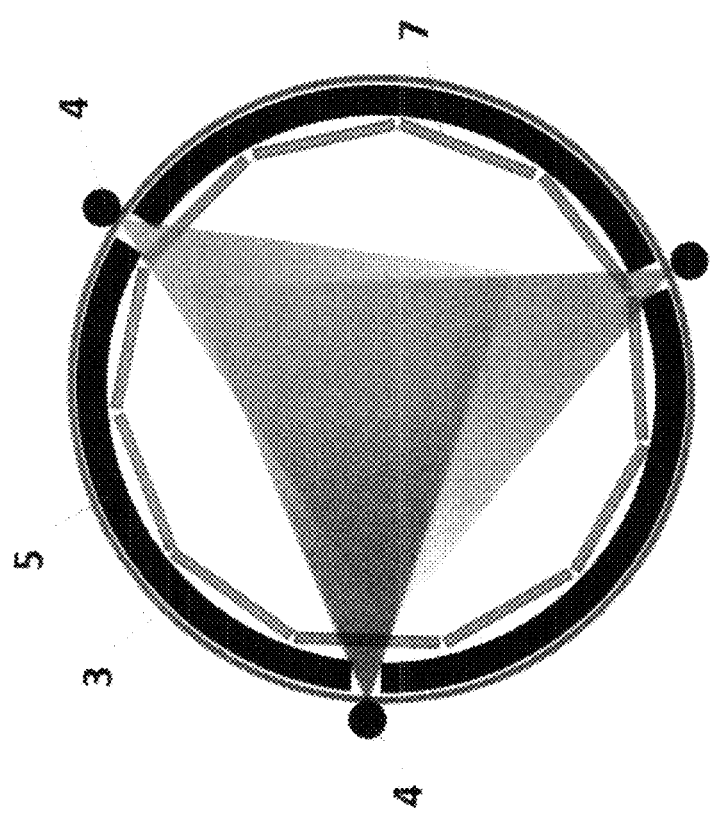
FIG. 3a shows a plan view of the schematic diagram of the invention with three pressure elements and with a rotating shield.

It shall be understood that the specific cases of the invention embodiments described and depicted below are provided for illustration only and do not limit the invention to the examples provided here. Persons skilled in the art will find or, based on routine experiments, will be able to provide a greater or lesser number of equivalents to the specific embodiments of the invention which are described here. Also such equivalents will be included in the scope of the following patent claims.

Example 1

FIG. 1 shows a schematic diagram of an example of the application of the X-ray instrument with the circular X-ray tube that can be used for X-ray laminography. The planar irradiated object 1, for example a composite plate, is positioned under the circular X-ray tube, of which only the circular body 2 is visible in the schematic diagram. The circular X-ray tube emits an X-ray beam striking upon the irradiated object 1. Under the object 1, an imaging detector 7 of ionizing radiation, whose impact detection surface is struck upon by the X-ray beam penetrating the object 1, is provided. The imaging detector 7 can be, for example, the model known under the TimePix brand.

The X-ray beam is gradually radiated within the full range of 360°, allowed by the circular X-ray tube, which results in the X-radiation passage through the exposed part of the irradiated object 1. The result of X-ray laminography is evaluated from a set of acquired images in a way known to a person skilled in the art that does not need to be described in detail to illustrate the example of the invention embodiment.

Example 2

FIG. 2*a* and FIG. 2*b* provide a schematic diagram of an example of the embodiment of the X-ray instrument with the circular X-ray tube with an unshielded X-ray beam. For better clarity of the figures, the circular body 2 is not provided. The circumferential element 3, comprised by e.g. a piece of plastic material, is supported by the circular body 2, or, where applicable, is integrated in the circular body 2. One pressure element 4 manufactured from e.g. tungsten is dragged upon the circumferential element 3. Eleven detectors 7 form a polygonal circular detection field without gaps that allows, with the rotating pressure element 4, eleven direct X-ray images per one revolution of the circular body 2 to be acquired. The detection field is arranged under the space delimited by the circular body 2, as shown in FIG. 2*b*. The detectors 7 can be tilted with regard to the X-ray beam to improve the X-radiation incidence onto their impact detection surface.

In a modified Example 2, not provided in the figure, a plurality of pressure elements 4 can be dragged upon the circumferential element 3 at the same time, which results in n*11 of images per revolution of the pressure elements 4, where n is a substituent of the actual number of the pressure elements 4. The number of the pressure elements 4 cannot be increased unlimitedly as with a larger number of triboluminescent sources emitting at the same time, X-ray images become distorted.

Example 3

Figure 3B:
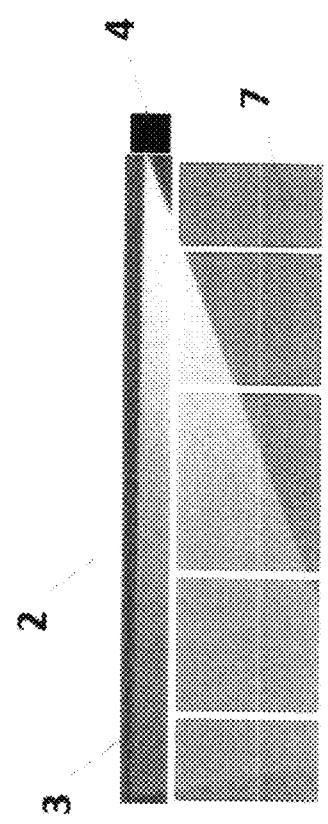
FIG. 3b shows a side view of the schematic diagram of the invention with three pressure elements and with a rotating shield.

FIG. 3*a* and FIG. 3*b* provide a schematic diagram of an example of the embodiment of the X-ray instrument with the circular X-ray tube with an X-ray beam collimated by a shield 5. For better clarity of the figures, the circular body 2 is not provided but only the shield 5 is provided in the figure. The shield 5 is comprised of for example lead. The schematic diagram shows three openings in the shield 5 that collimate X-ray beams from three neighbouring pressure elements 4. The pressure elements 4 have regular distances from one another. The detectors 7 are employed similarly as in Example 2.

The shield 5 rotates together with the rotating pressure elements 4, so that the openings in the shield 5 correspond with the pressure elements 4. The collimation of X-ray beams eliminates X-ray image distortion.

Example 4

FIG. 4 shows a schematic diagram of an embodiment of the X-ray instrument where, unlike in Example 3, a plurality of collimators (openings in the shield 5), that do not rotate together with the pressure elements 4, are employed. The pressure elements 4 and/or collimators do not have to be at regular mutual distances. Due to the different mutual distance each pressure element 4 has a different irradiation angle with regard to the irradiated object 1. The detectors 7 can be arranged in the detection field in an irregular way with gaps between individual detectors 7. The mutual position of the openings in the shield 5 and the detectors 7 is selected in a manner minimizing the interference of acquired images by the neighbouring sources of X-radiation.

In the X-ray instrument provided in FIG. 4 the entire system can rotate within a limited range of angles to acquire tomographic projections from a plurality of angles.

Example 5

Figure 5A:
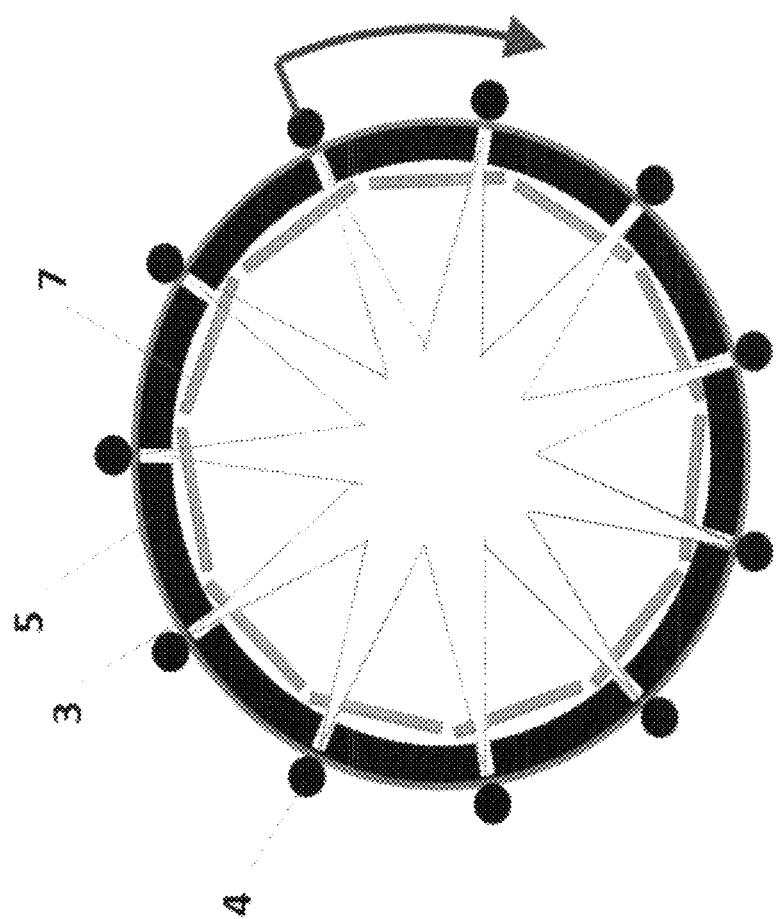
FIG. 5a shows a plan view of the schematic diagram of the invention with rotating pressure elements and a rotating shield.
Figure 5B:
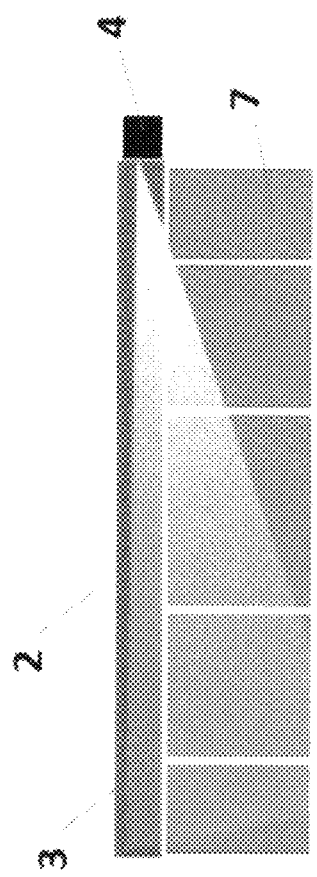
FIG. 5b shows a side view of the schematic diagram of the invention with rotating pressure elements and with a rotating shield.

FIG. 5*a* and FIG. 5*b* provide an embodiment of the X-ray instrument whose circular X-ray tube is fitted with the pressure elements 4 and the rotary shield 5 for the simultaneous rotational movement of the openings in the shield 5 and the pressure elements 4. The detection field comprises eleven detectors 7 with minimal gaps in between. FIG. 5*a* shows the beams of X-radiation penetrating the detectors 7 that are arranged in the space delimited by the circular body 2. The detectors 7 are silicon-based and therefore their effect on the passing the beams of X-radiation is minimal.

If the irradiation should not include X-radiation passing through the detectors 7, it is possible to arrange the detection field of the X-ray instrument under the space delimited by the circular body 2 of the circular X-ray tube as shown in FIG. 5*b*.

Example 6

FIG. 6 shows a schematic diagram of an embodiment of the X-ray instrument whose circular X-ray tube has a high number of pressure elements 4 arranged along the circumferential element 3. The pressure elements 4 rotate around the circumferential element 3. The circular X-ray tube is fitted with the shield 5 with eleven collimation openings that are static. The circular X-ray tube is used in the X-ray instrument fitted with eleven detectors 7 arranged into a detection field.

The pressure elements 4 start rotating and whenever the pressure element 4 passes the opening of the shield 5 a flash of X-radiation from the beam is generated. It is possible to acquire eleven images at the same time per unit of time. A person skilled in the art can easily adjust the number of collimation openings in the circular X-ray tube and the number of the detectors 7 in the detection field of the X-ray instrument. A higher number of pressure elements 4 and the speed of their rotational movement affect the number of images per unit of time.

To increase the number of irradiation angles, the object 1 must rotate, or the circular X-ray tube with the detectors 7 must rotate in the X-ray instrument around the object 1.

Example 7

FIG. 7 shows a schematic embodiment of the X-ray instrument whose circular X-ray tube is, unlike in Example 6, fitted with wider collimation openings in the shield 5. The X-ray instrument utilizing this circular X-ray tube is fitted with the detectors 7, whose impact detection surfaces are equipped with grid electrodes 8 to shield the beams of X-radiation striking upon the impact detection surface of the detectors 7 at an undesirable angle. The detection field comprises gaps between the detectors 7 adjacent to the collimation openings in the shield 5 allowing the beam of X-radiation to freely pass through to the irradiated object 1. The detection field is arranged in the space delimited by the circular body 2.

To increase the number of irradiation angles, the object 1 must rotate, or the circular X-ray tube with the detectors 7 must rotate in the X-ray instrument around the object 1.

Example 8

Figure 8A:
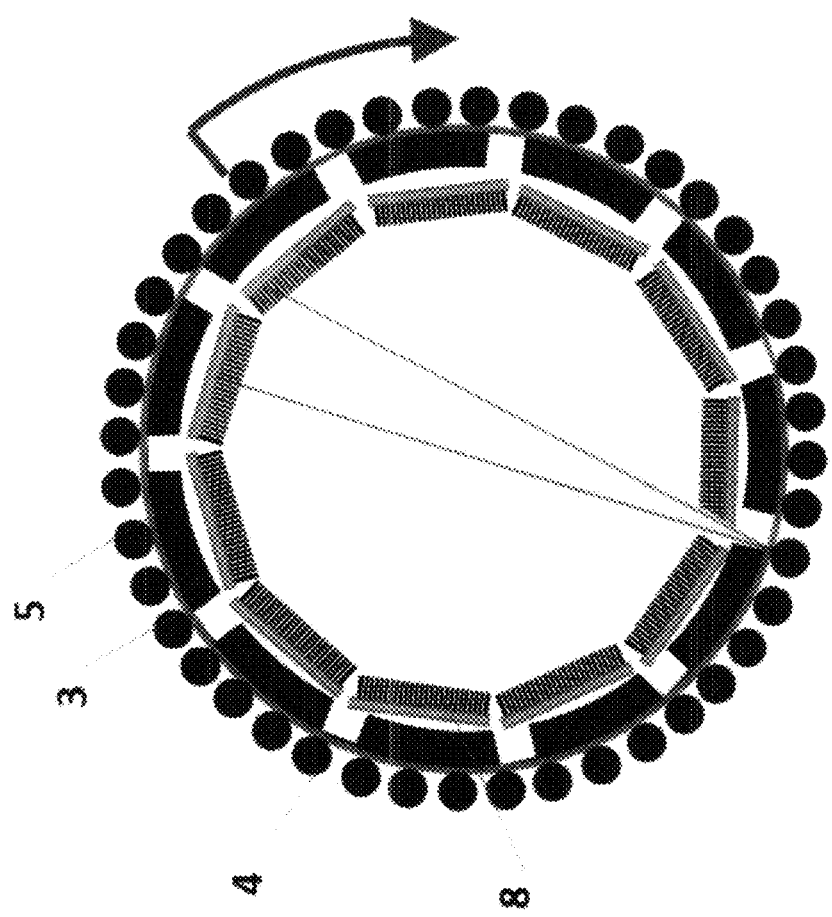
FIG. 8a shows a plan view of the schematic diagram of the invention with wide shield collimation openings and with detectors fitted with a grid electrode to shield X-ray beams with an undesirable angle of incidence.
Figure 8B:
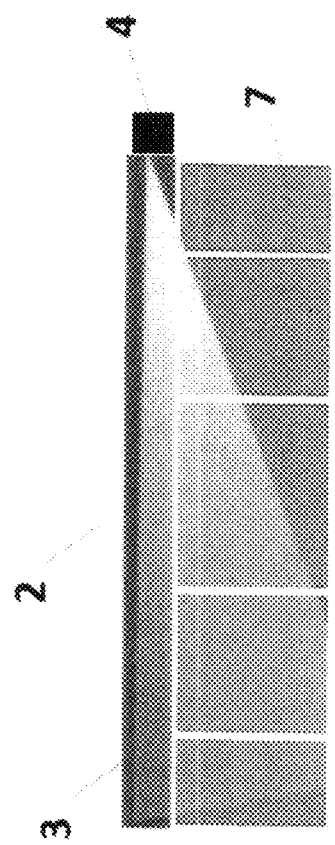
FIG. 8b shows a side view of the schematic diagram of the invention with wide shield collimation openings and with detectors fitted with a grid electrode to shield X-ray beams with an undesirable angle of incidence.

FIG. 8a and FIG. 8b shows a schematic diagram of an embodiment of the X-ray instrument derived from the X-ray instrument provided in Example 7. The main difference of this embodiment of the invention rests in the fact that the field is arranged under the space delimited by the circular body 2. Due to the fact that the detectors 7 do not shield the beams of X-radiation coming from the shield 5 openings, no gaps are provided between the detectors 7.

Example 9

FIG. 9 shows a schematic diagram of an embodiment of the X-ray instrument whose circular X-ray tube has a circumferential element 3 comprising a friction belt rewound by two wind-up spools 6. The wind-up spools 6 may be equipped, for example inside their drums, with a drive on the basis of electric motor. Tensioning pins 10 to tension the friction belt 3 prior to winding onto the wind-up spools 6 are arranged at the circumferential element 3. The friction belt is made of flexible plastic material and its contact surface, against which the pressure elements 4 are pressed, is fitted with microparticles increasing its sliding friction coefficient.

The illustrated embodiment of the invention shows a friction belt shared by all pressure elements 4. However, it is possible to equip the circular X-ray tube for each pressure element 4 with a separate friction belt with own wind-up spools 6.

The detection field of the X-ray instrument has gaps between individual detectors 7 to ensure the undisturbed passage of the beams of X-radiation.

To change irradiation angles when acquiring X-ray images it is possible to rotate the irradiated object 1 or turn the X-ray instrument around the object through an angle within a limited range of angles.

Example 10

Figure 10A:
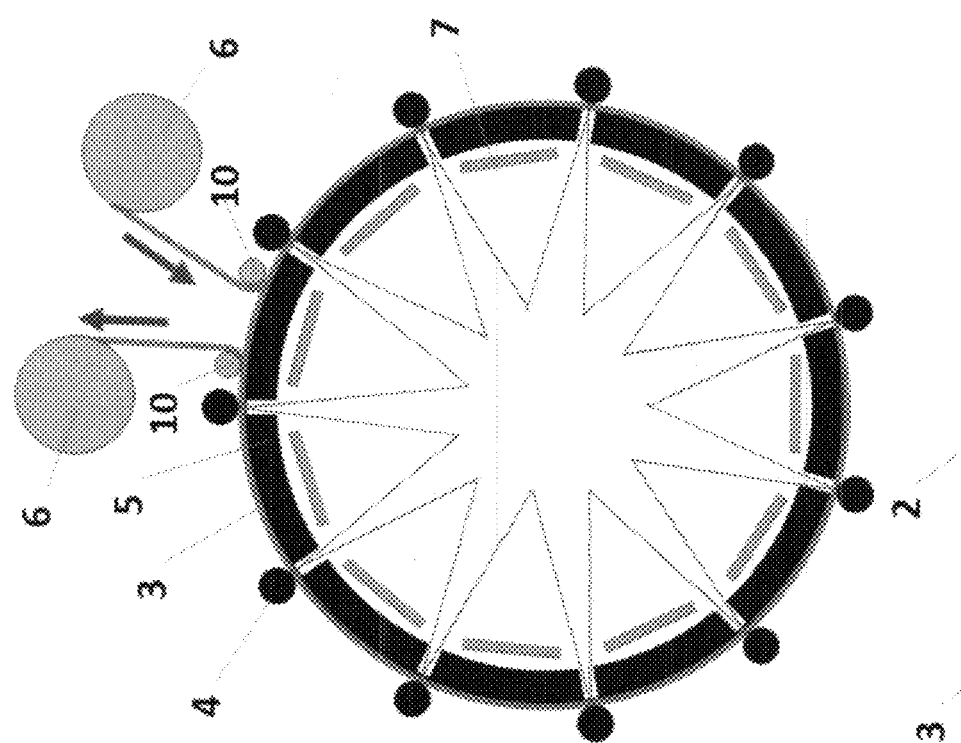
FIG. 10a shows a plan view of the schematic diagram of the invention with a circumferential element comprising a friction belt wound on wind-up spools and with movable pressure elements.
Figure 10B:
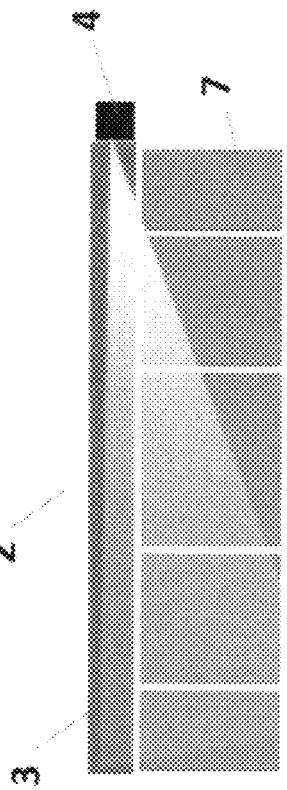
FIG. 10b shows a side view of the schematic diagram of the invention with a circumferential element comprising a friction belt wound on wind-up spools and with movable pressure elements.

FIG. 10a and FIG. 10b show a schematic diagram of an embodiment of the X-ray instrument whose circular X-ray tube has a circumferential element 3 comprising a friction belt rewound by two wind-up spools 6. The difference from Example 9 is the position of the detector 7 outside the plane with the X-radiation sources 2, see FIG. 10b. This will enable a limited rotational movement of the X-radiation source to acquire a larger scope of projection angles. The friction belt comprising the circumferential element 3, pressure elements 4 and collimation openings in the shield 5 turns through an angle with regard to the detectors 7. To change irradiation angles when acquiring X-ray images it is also possible to rotate the irradiated object 1.

Example 11

Figure 11:
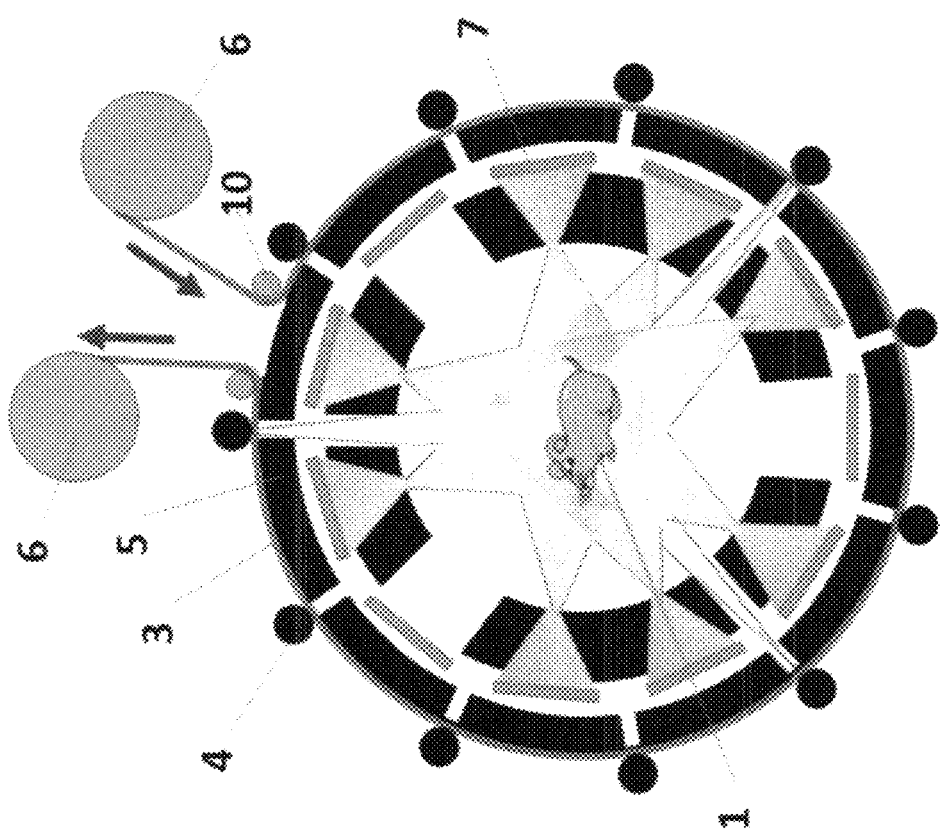
FIG. 11 shows a schematic diagram of the use of the invention fitted with a secondary shield.

FIG. 11 shows a schematic diagram of an embodiment of the X-ray instrument that is fitted with a secondary shield 9 to shield the direct beams of X-radiation. The secondary shield 9 is equipped with collimation openings allowing the passage of scattered X-radiation and fluorescent X-radiation towards the detectors 7. In addition, the secondary shield 9 is fitted with openings for the passage of a direct beam of X-radiation penetrating the irradiated object 1 towards the detector 7. Due to this arrangement it is possible to measure in both the transmission mode (standard CT) and in the mode that creates images using scattered and/or fluorescent radiation and the technique of camera obscura. Information from all three modes of imaging can be combined.

The secondary shield 9 is stationary with regard to the X-ray tube and the entire instrument rotates with regard to the object 1 or the object 1 rotates with regard to the X-ray instrument.

Example 12

FIG. 12 shows a schematic embodiment of the X-ray instrument whose circular X-ray tube is divisible into two halves according to division boundaries 11. Each half of the circular X-ray tube is fitted with its own circumferential element 3 in the form of the friction belt wound onto the wind-up spools 6.

Example 13

FIG. 13 shows a schematic diagram of an embodiment of the X-ray instrument whose circular X-ray tube is fitted with two circumferential elements 3 in the form of two friction belts. Each circumferential element 3 has its own wind-up spools 6.

The pressure elements 4 form a point of tension situated at the collimation opening of the shield 5, where the pulled-through bottom circumferential element 3 rubs against the upper circumferential element 3 that forms a barrier protecting the pressure element 4 against wearing.

It applies to all the aforementioned examples that the means for rotational movement of the object 1 can be an adjustable table, or where applicable, a handling arm representing a technically feasible problem for a person skilled in the art. A means for the implementation of movements in the X-ray instrument is for example an electric motor whose rotational action is transferred by gears or belts to the movable parts of the X-ray instrument.

It is obvious that a person skilled in the art may combine other embodiments of the invention from the selected parameters of the aforementioned examples.

INDUSTRIAL APPLICABILITY

The circular X-ray tube and the X-ray instrument with the circular X-ray tube according to the invention will find application in the field of research and development, in industry, in particular for quality control, and also in the public health sector.

OVERVIEW OF THE POSITIONS 1 object
2 circular body
3 circumferential element
4 pressure element
5 shield
6 wind-up spools
7 ionizing radiation detector
8 detector grid electrode
9 secondary shield
10 tensioning pin
11 division boundary

The invention claimed is:
1. A circular triboluminescent X-ray tube for irradiation of an object by X-radiation comprising:

a circular body fitted with at least one shield of ionizing radiation, where the shield is equipped with at last one opening for the unshielded passage of X-radiation;

at least one circumferential element arranged on an exterior circumferential side of the circular body; and at least one pressure element that is pressed against the circumferential element;

where the pressure element is adapted for dragging upon the circumferential element, and/or the circumferential element is adapted for pulling through under the pressure element.

2. The X-ray tube according to claim 1 characterized in that the position of the opening in the shield with regard to the circular body and/or the size of the opening in the shield is adjustable in a controlled manner.

3. The X-ray tube according to claim 1 characterized in that the shield is movable with regard to the circular body.

4. The X-ray tube according to claim 1 characterized in that the circumferential element comprises at least one friction belt whose free ends are fixed to wind-up spools.

5. The X-ray tube according to claim 1 characterized in that the circular body is openable or dismountable into at least two parts.

\* \* \* \* \*